(12) United States Patent
Orian

(10) Patent No.: US 12,082,587 B2
(45) Date of Patent: Sep. 10, 2024

(54) WAFFLE MAKER AND GRIDDLE DESIGN

(71) Applicant: GRRIDLE LLC, Fall Creek, OR (US)

(72) Inventor: Omer Orian, Fall Creek, OR (US)

(73) Assignee: GRRIDLE LLC, Fall Creek, OR (US)

( * ) Notice: Subject to any disclaimer, the term of this patent is extended or adjusted under 35 U.S.C. 154(b) by 101 days.

(21) Appl. No.: 17/395,936

(22) Filed: Aug. 6, 2021

(65) Prior Publication Data
US 2023/0043934 A1   Feb. 9, 2023

(51) Int. Cl.
  *A21B 1/42*   (2006.01)
  *A21B 5/02*   (2006.01)
  *A47J 37/06*  (2006.01)

(52) U.S. Cl.
  CPC ............. *A21B 1/42* (2013.01); *A21B 5/023* (2013.01); *A47J 37/0611* (2013.01)

(58) Field of Classification Search
  CPC ......... A21B 1/42; A21B 5/023; A47J 37/0611
  USPC ........................................... 99/377
  See application file for complete search history.

(56) References Cited

U.S. PATENT DOCUMENTS

| | | | |
|---|---|---|---|
| 7,514,655 B2 * | 4/2009 | Fernandez | A47J 37/0611 99/380 |
| 2010/0024662 A1 * | 2/2010 | Bengtson | A47J 37/0611 99/377 |

FOREIGN PATENT DOCUMENTS

| | | | | |
|---|---|---|---|---|
| EP | 2604157 | * | 7/2014 | A47J 37/06 |

OTHER PUBLICATIONS

Machine Translation of EP2604157 (Year: 2023).*

* cited by examiner

*Primary Examiner* — Nathaniel E Wiehe
*Assistant Examiner* — Thomas J Ward
(74) *Attorney, Agent, or Firm* — Klarquist Sparkman, LLP

(57) ABSTRACT

A cooking apparatus includes a base, a first cooking assembly, a second cooking assembly pivotably coupled to the first cooking assembly, and a pair of removable cooking surfaces, the first cooking assembly and the second cooking assembly each being rotatably coupled to the base and configured to receive a respective removable cooking surface. The first cooking assembly and the second cooking assembly are moveable between an opened state and a closed state. The first cooking assembly and the second cooking assembly are configured to rotate about a first rotational axis while in the closed state and pivot relative to one another about a second rotational axis while in the opened state.

7 Claims, 8 Drawing Sheets

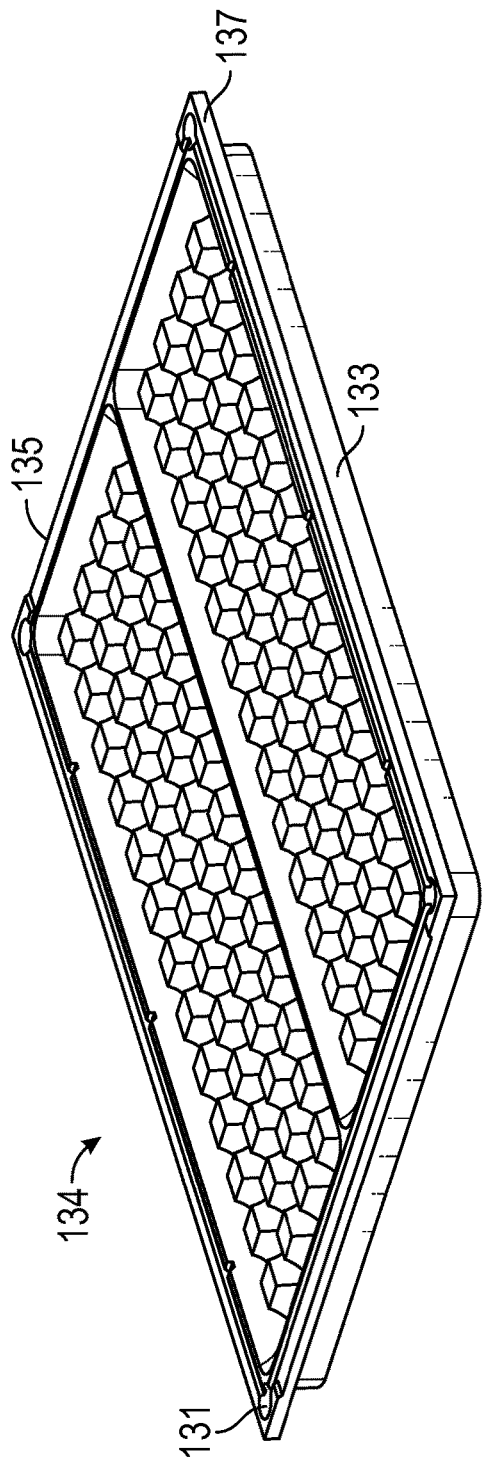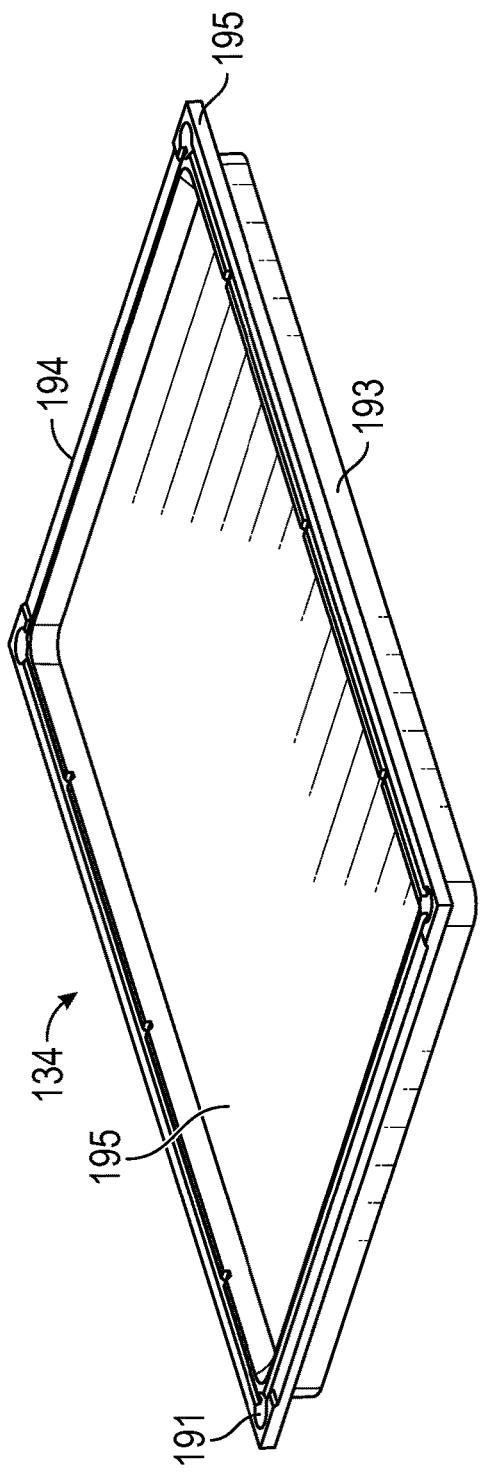

WAFFLE MAKER AND GRIDDLE DESIGN

FIELD

The present disclosure relates to cooking equipment.

BACKGROUND

Waffle makers and griddles have become a staple in both residential and commercial kitchens. This equipment allows an easy way to produce and incorporate many of one's favorite foods into home and restaurant menus, such as Belgian waffles, cones, pancakes, etc. However, current waffle maker and griddle designs still limit the functionality and utility of this equipment, including for multifunctional uses. Improvement in the field is needed.

SUMMARY

In one representative embodiment, a cooking apparatus is provided. The cooking apparatus includes a base, a first cooking assembly, a second cooking assembly pivotably coupled to the first cooking assembly, and a pair of removable cooking surfaces, the first cooking assembly and the second cooking assembly each being rotatably coupled to the base and configured to receive a respective removable cooking surface. The first cooking assembly and the second cooking assembly are moveable between an opened state and a closed state, the opened state being a configuration in which the cooking surface of the first cooking assembly and the cooking surface of the second cooking assembly are spaced apart and facing the same direction, and the closed state being a configuration in which the cooking surface of the first cooking assembly and the cooking surface of the second cooking assembly are facing each other in an opposing relationship. The first cooking assembly and the second cooking assembly are configured to rotate about a first rotational axis while in the closed state and pivot relative to one another about a second rotational axis while in the opened state.

In another representative embodiment, a cooking apparatus includes a base, a first cooking assembly, and a second cooking assembly, each cooking assembly comprising a cooking surface, and a hinge comprising a first portion and a second portion. The first portion of the hinge includes a first knuckle and a first leaf coupled to the first cooking assembly and the second portion of the hinge includes a second knuckle and a second leaf coupled to the second cooking assembly, wherein the first knuckle and the second knuckle are coaxially aligned and configured to rotate relative to one another such that the first cooking assembly and the second cooking assembly pivot relative to one another about a first rotational axis. The hinge is rotatably coupled to the base such that the first cooking assembly and the second cooking assembly are configured to rotate about a second rotational axis.

In another representative embodiment, a waffle maker includes a base, a first cooking assembly, a second cooking assembly coupled to the first cooking assembly, a pair of removable waffle cooking surfaces, and a pair of removable griddle cooking surfaces, the first cooking assembly and the second cooking assembly each configured to receive a respective removable cooking surface. The waffle maker also includes a hinge including a first portion and a second portion, the first portion of the hinge including a first knuckle and a first leaf coupled to the first assembly and the second portion of the hinge including a second knuckle and a second leaf coupled to the second assembly. The first knuckle and the second knuckle are coaxially aligned and configured to rotate relative to one another such that the first assembly and the second assembly pivot relative to one another about a first rotational axis. A pair of stopper members are also included, each stopper member configured to couple to and decouple from the first and second knuckles and limit relative movement between the first and second cooking assemblies. The hinge is rotatably coupled to the base such that the first cooking assembly and the second cooking assembly are configured to rotate about a second rotational axis.

The foregoing and other objects, features, and advantages of the invention will become more apparent from the following detailed description, which proceeds with reference to the accompanying figures.

BRIEF DESCRIPTION OF THE DRAWINGS

FIG. 7 is a perspective view of a waffle plate of the cooking apparatus of FIGS. 1-5.

FIG. 8 is a perspective view of a griddle plate of the cooking apparatus of FIG. 6.

DETAILED DESCRIPTION

Figure 1:
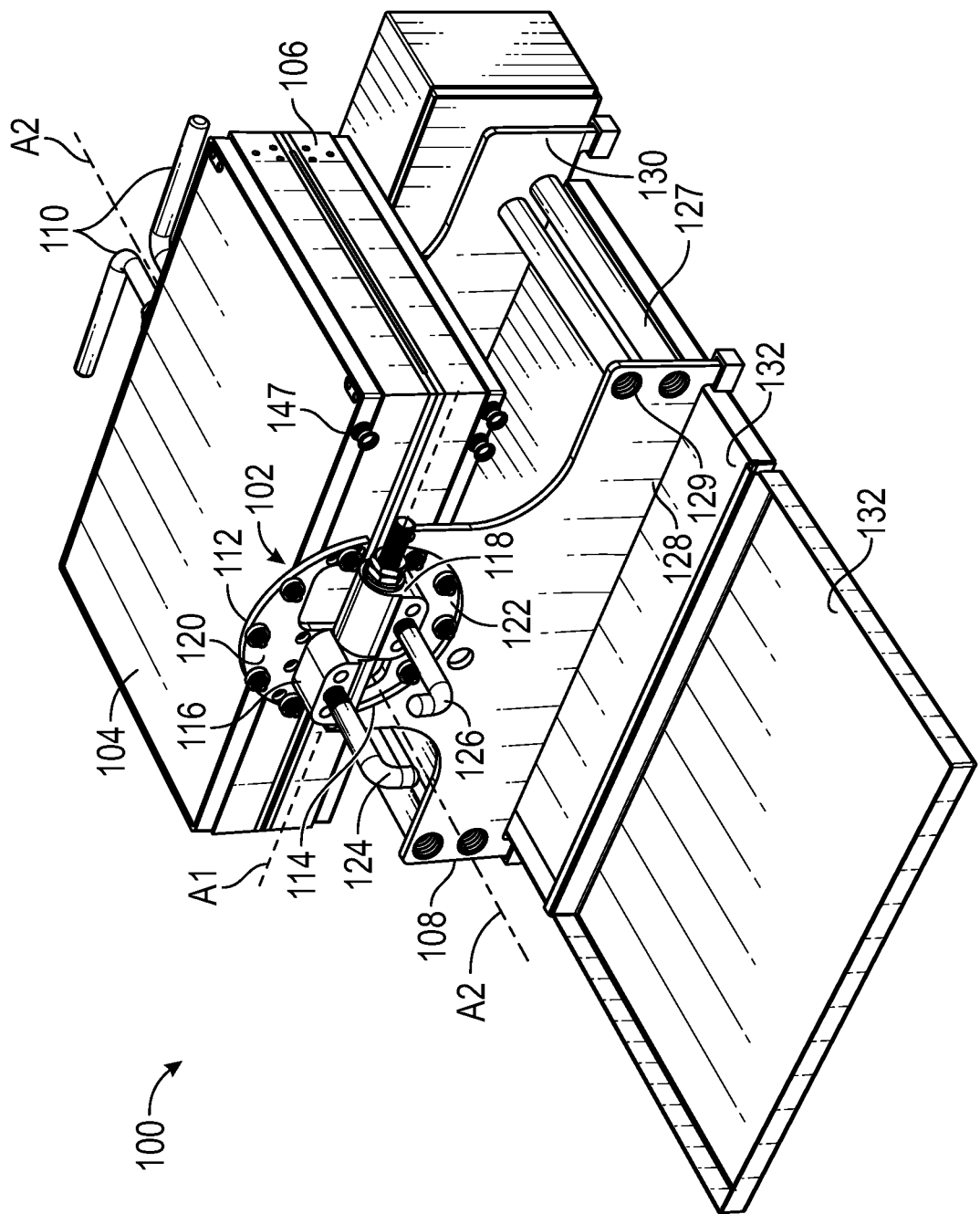
FIG. 1 is a perspective view of a waffle maker and griddle cooking apparatus of the present disclosure.
Figure 5:
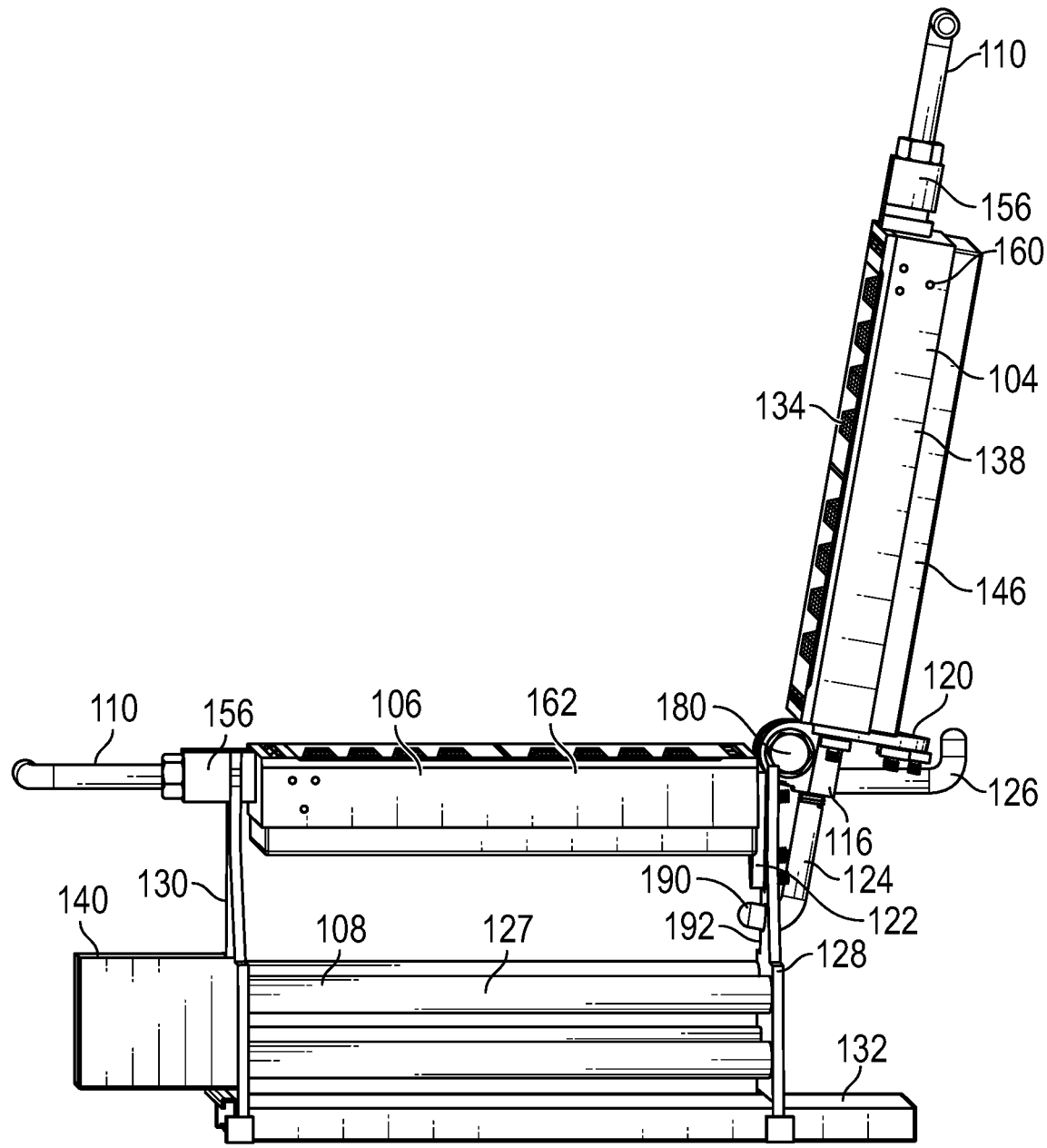
FIG. 5 is a side-elevation view of the cooking apparatus of FIGS. 1-4, in an opened state.
Figure 6:
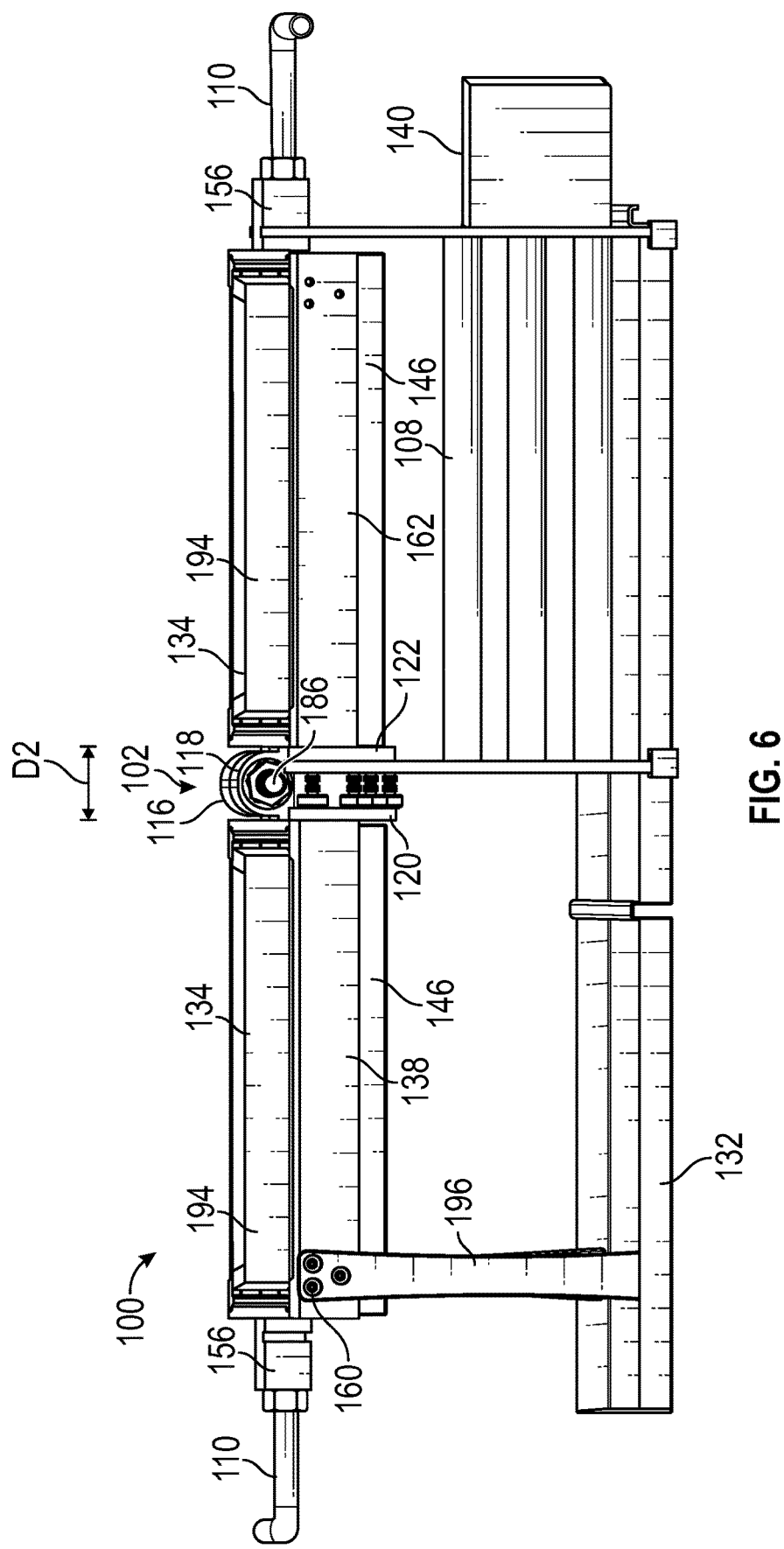
FIG. 6 is a side-elevation view of the cooking apparatus of FIGS. 1-5, in a fully opened stated.

FIG. 1 shows a waffle and griddle cooking apparatus 100 according to the present disclosure. The apparatus 100 includes a hinge 102, a first cooking assembly 104, a second cooking assembly 106, and a base 108. As illustrated in FIG. 1, the first cooking assembly 104 and second cooking assembly 106 are coupled to one another via the hinge 102. The configuration of the hinge 102 allows for relative movement between the two assemblies 104, 106 about a first rotational axis A1, such as when the apparatus 100 is moved between a closed state (FIG. 1) and an opened state (FIGS. 5-6). The configuration of the hinge 102 also allows the two assemblies 104, 106 to rotate in combination about a second rotational axis A2. Handles 110 coupled to the first and second cooking assemblies 104, 106 can be used to rotate the assemblies about the second rotational axis A2 and/or move the cooking assemblies 104, 106 between opened and closed states about the first rotational axis A1. As shown in FIG. 1, the first and second rotational axes A1, A2 can be perpendicular to one another.

As shown in FIGS. 1-2 and 4-5, the relative positioning of the first cooking assembly 104 in either an opened or closed state is generally above the relative positioning of the second cooking assembly 106. Accordingly, the first cooking assembly 104 can also be referred to as an upper assembly. By extension, the second cooking assembly 106 can also be referred to as a lower assembly. Inversely, when the first and second cooking assemblies 104, 106 are rotated about the second rotational axis A2 (e.g., 180 degrees) and inverted, the second cooking assembly 106 can be referred to as the upper cooking assembly while the first cooking assembly 104 can be referred to as the lower assembly.

As shown in FIG. 1, the hinge 102 includes a first portion 112 coupled to the first assembly 104 and a second portion 114 coupled to the second assembly 106. The first and second portions 112, 114 each include a respective knuckle 116, 118 and a leaf 120, 122, which allow for relative movement between the first and second assemblies 104, 106 about the rotational axis A1. The knuckles 116, 118 of the hinge 102 can also be configured to couple and decouple to stopper members 124, 126, which are configured to limit the relative movement between the first and second assemblies 104, 106, such as through contact between the stopper members and one or more components of the apparatus 100 as the apparatus is opened.

The first assembly 104 and second assembly 106 can also be coupled to the base 108. As shown in FIG. 1, the base 108 can include a pair of upwardly extending brackets 128, 130 that are coupled to and support the first and second assemblies 104, 106. On one side of the apparatus 100, for instance, the first and second assemblies 104, 106 can be rotatably coupled to the bracket 128 via the hinge 102 and a plurality of rotational elements of the hinge 102 in contact with the bracket 128 (e.g., FIGS. 4A-4B). The first and second assemblies 104, 106 can be further coupled to and supported by bracket 130 via the handle members 156. The handle members 156 can, for example, be received by the bracket 130 in such a way that the handle members 156 are configured to rotate relative to the bracket 130 as the first and second assemblies 104, 106 rotate. In this configuration, both the first assembly 104 and second assembly 106 can rotate about the second rotational axis A2.

As shown in FIG. 1, a drip tray 132 can also be included with the base 108 for catching food particles from the first and second assemblies 104, 106. In some examples, such as when the apparatus 100 is an a fully opened state (FIG. 6), one segment of the drip tray 132 can be positioned under the second assembly 106, while the other segment can be positioned below the first assembly 104. In some examples, the drip tray 132 extends under the brackets 128 of the base 108, while in other examples, the drip tray 132 can be sized and shaped to receive the brackets 128, 130 or need not be included.

Figure 2:
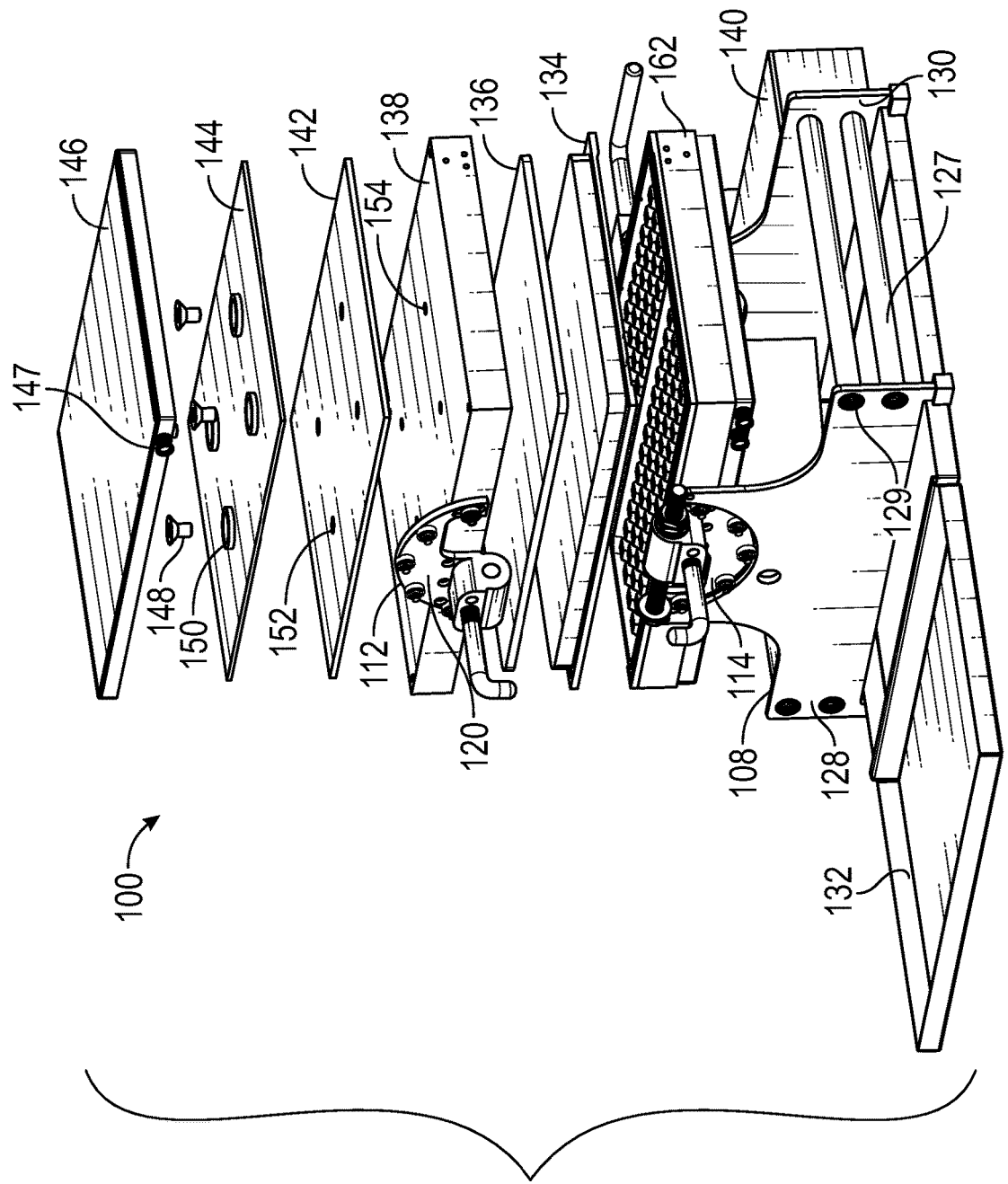
FIG. 2 is a perspective view of the cooking apparatus of FIG. 1, in a partially exploded state.

FIG. 2 shows the apparatus 100 in a closed and partially exploded state. For ease of discussion, only the first assembly 104 is viewed in an exploded state. However, it should be understood the second assembly 106 generally includes the same combination of components as the first assembly 104.

Figure 3:
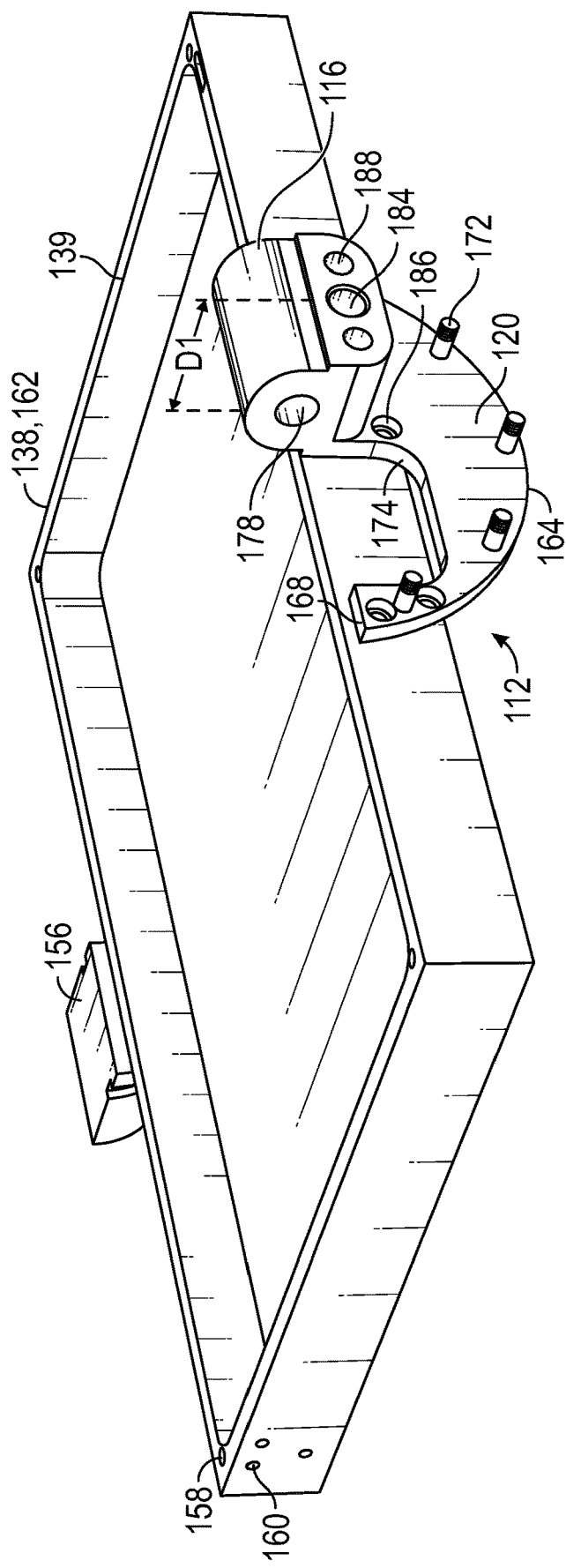
FIG. 3 is a perspective view of a recessed plate and a hinge of the cooking apparatus of FIGS. 1-2.

FIG. 2 shows that the first assembly 104 includes a cooking surface 134, an insert plate 136, and a recessed plate 138 (FIG. 3). The recessed plate 138 is coupled to the hinge 102 and configured to house the cooking surface 134 and in some examples, the insert plate 136. The first assembly 104 can also include a heating element 142, a press plate and/or fixing plate 144, and an outer panel 146 coupled to and configured to enclose the heating element 142 and fixing plate 144.

The heating element 142 can be situated between the recessed plate 138 and the fixing plate 144. The heating element 142 is operable to produce a desired amount of heat such that heat is transferred through the recessed plate 138, the insert plate 136, and to the exposed surface of the cooking surface 134. For this reason, the heating element 142 can be constructed from cast iron, carbon steel, aluminum, steel, or other material having a desired coefficient of thermal conductivity. In some examples, the heating element 142 is coupled to an electrical source or control system (FIG. 9), which is operative to provide and control the energy used in heating the cooking surface 134 when operating the apparatus 100. In other examples, energy supplied to the heating element 142 is provided via gas, induction, and/or any other suitable heating source.

The heating element 142 can be coupled to the recessed plate 138 via the fixing plate 144 and a plurality of screws 148 extending through corresponding openings 150, 152, 154 of each plate. The outer panel 146 can also be coupled directly to the recessed plate 138 and/or the fixing plate 144 with one or more screws or bolts. In contrast to the heating element 142, the fixing plate 144 and/or outer panel 146 can be constructed of a low thermal conductive material. In this way, the fixing plate 144 and the outer panel 146 can contain the heat irradiating from the heating element 142 and recessed plate 138 such that heat loss is limited and electronic components housed within the first assembly 104 are free from elevated temperatures.

Figure 9:
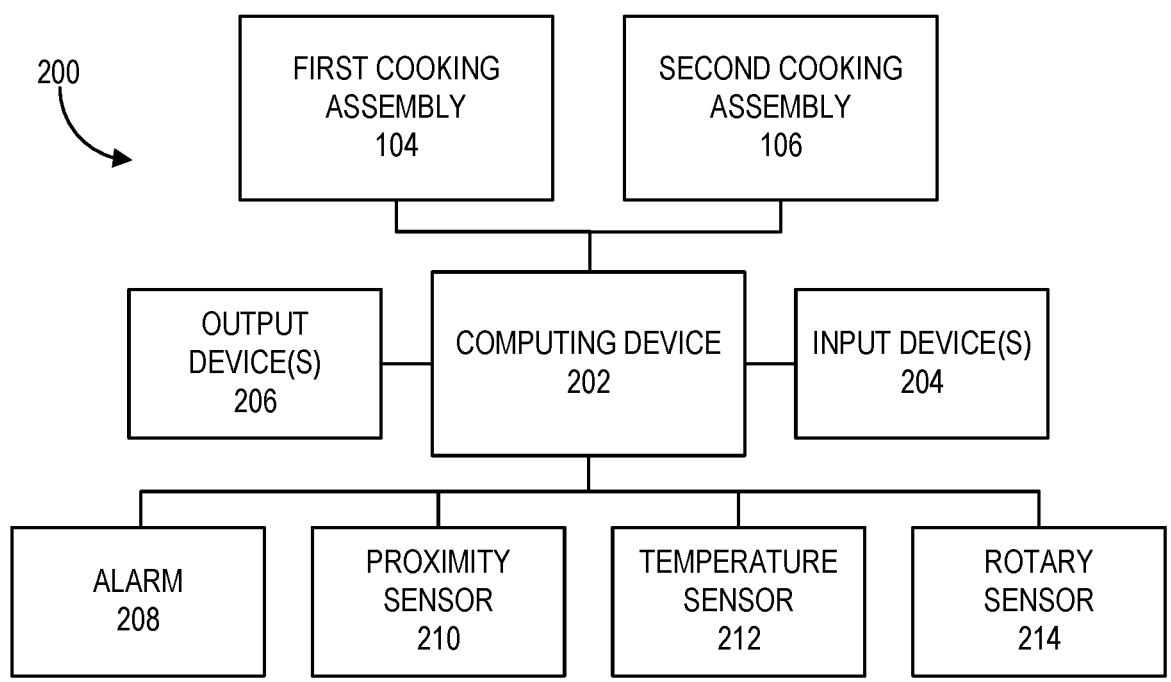
FIG. 9 is a block diagram of a control system for the cooking apparatus of FIGS. 1-6.

As will be further described, the apparatus 100 also includes a housing 140, which can house one or more electronic components used for operating the apparatus 100 (FIG. 9). For example, an energy source, computing device, switches, display, microcontroller, memory, circuitry, wiring, temperature controller, thermocouple, or any other components for operation. In a similar manner, one or more electronic components can be housed within the outer panel 146, such as for operating the heating element 142.

In representative examples, the cooking surfaces 134 of the apparatus 100 can be removable and interchangeable such that the cooking surface of each assembly can be switched between two or more configurations. As shown in FIGS. 2 and 7, for instance, the cooking surface 134 can be configured as a waffle plate 135 having a waffle grid pattern (e.g., a Liege waffle plate). The waffle plate 135 cooking surface 134 can be used, for example, in instances when the apparatus 100 is operating in a "waffle mode" (e.g., FIGS. 4-5), such as to produce waffles, cones, or other like food. In an alternative configuration, and as shown in FIGS. 6 and 9, the cooking surface 134 can also be configured as a griddle plate 194 having a flat, planar surface for when the apparatus 100 is operating in a "griddle mode" (FIG. 6), such as for cooking pancakes, eggs, meat, etc.

Although the cooking surfaces 134 are described herein with particularity, it should be understood that the cooking surfaces can be formed in a variety of different configurations, such as Brussels waffle plates, Takoyaki plates, grill plates, and/or other desired cooking surfaces. The cooking surfaces 134 (waffle plate 135 and griddle plate 194) can also be constructed from cast iron, carbon steel, aluminum, steel, or other material having a desired coefficient of thermal conductivity for transferring heat from the recessed plate 138 and/or insert plate 136 to the exposed cooking surface.

For the purpose of discussion, FIG. 3 is used to represent the recessed plates 138, 162 of both the first and second assemblies 104, 106. FIG. 3 shows the recessed plates 138, 162 and the recess thereof directed in an upward direction. The recess within each recessed plate 138, 162 can have a depth configured to receive a respective removable/interchangeable cooking surface 134. In particular, the depth and inner volume of the recessed plates 138, 162 provides adequate space to receive the plates forming the cooking surfaces 134 (e.g., waffle plate 135 and/or griddle plate 194). The plates can be situated either through direct or indirect contact with the recessed plates 138, 162 to receive heat transferred through the recessed plates 138, 162 and from the heating elements 142. In representative examples, the recessed plates 138, 162 can be suitably formed to accommodate both relatively deep cooking surfaces (e.g., Brussels and Takoyaki plates) and/or relatively shallow plates, such as waffle and griddle plates 135, 194 described herein.

As mentioned, the recessed plates 138, 162 of the cooking assemblies 104, 106 can also be configured (i.e., have a depth and an inner volume) to house the cooking surfaces 134 and an insert plate 136. The insert plates 136 can, in some instances, be used to fill a gap formed between the outer surfaces 133, 193 of the cooking surfaces 134 and the inner surface of the recessed plates 138, 162 when the cooking surfaces 134 are received by the recessed plates. For example, the waffle and griddle plates 135, 194 forming the cooking surfaces 134 can have a relatively shallow depth and low volume in comparison to the total depth and inner volume of the recessed plates 138, 162, such as when the recessed plates 138, 162 are configured to accommodate relatively deep cooking plates. This space between the outer surface 133, 193 of the plates 135, 194 and the inner surface of the recessed plates 138, 162 can, in some cases, create a region of low-heat transferability such that heat transfer to the cooking surface 134 is hindered or prevented. By situating the insert plates 136 between the outer surfaces 133, 193 of the cooking surfaces 134 and the inner surface of the recessed plates 138, 162, heat can be transferred to the cooking surface 134 through the insert plate 136 and recessed plate 138, 162. Accordingly, the insert plate 136 can also be constructed from cast iron, carbon steel, aluminum, steel, or other material having a desired coefficient of thermal conductivity for transferring heat to the cooking surface 134.

The waffle and griddle plates 135, 194 forming the cooking surfaces 134 can also have an outer lip 137, 195, which can be positioned atop or proximate a ridge 139 of the recessed plates 138, 162 once received. Each recessed plate 138, 162 can include a plurality of bores 158 along the ridge 139 of the recess that can be used to couple the cooking surfaces 134 to the recessed plates 138, 162. In particular, bores 158 can be configured to receive screws or bolts extending through the corresponding openings 131, 191 of the waffle and griddle plates 135, 194. In addition to or in lieu of using screws or bolts, in some configurations, the plates 135, 194 can be coupled to the recessed plates 138, 162 using one or more other fasteners, such as clips, pegs, flexible members, and/or any other suitable fasteners.

Figure 4A:
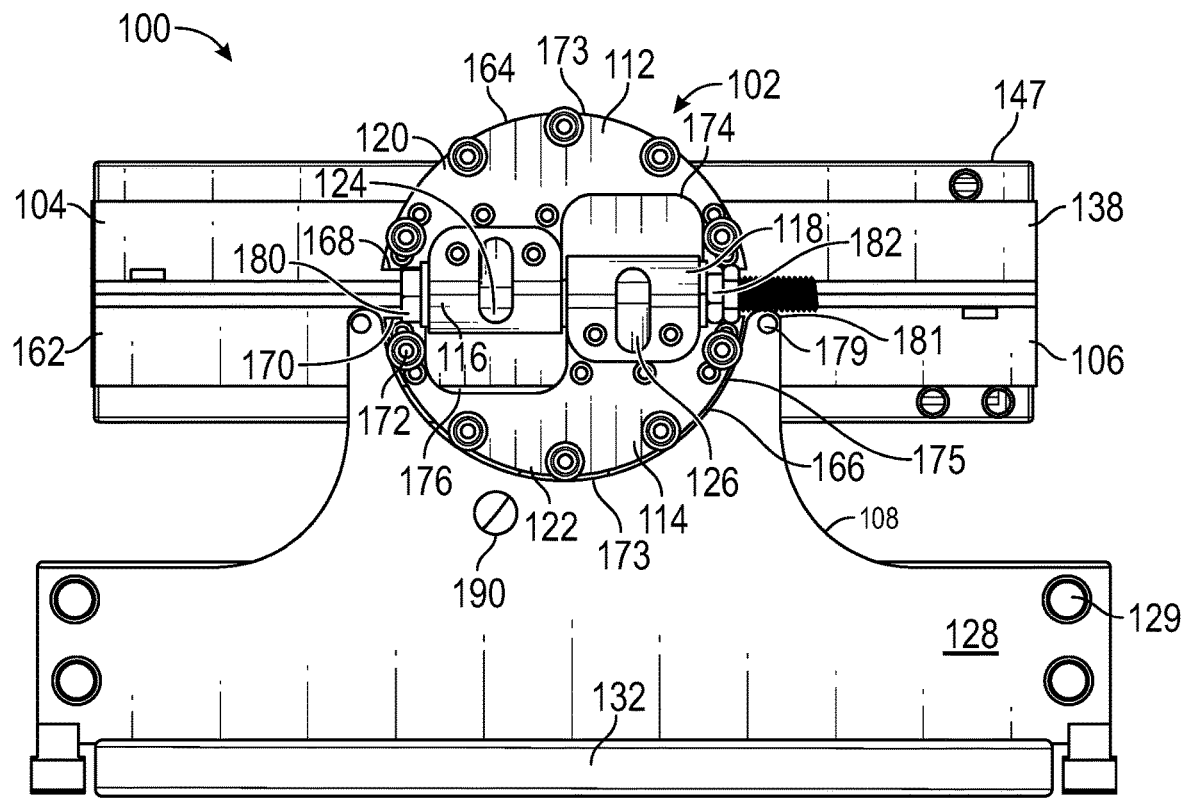
FIG. 4A is a side-elevation view of the cooking apparatus of FIGS. 1-3, in a closed state.
Figure 4B:
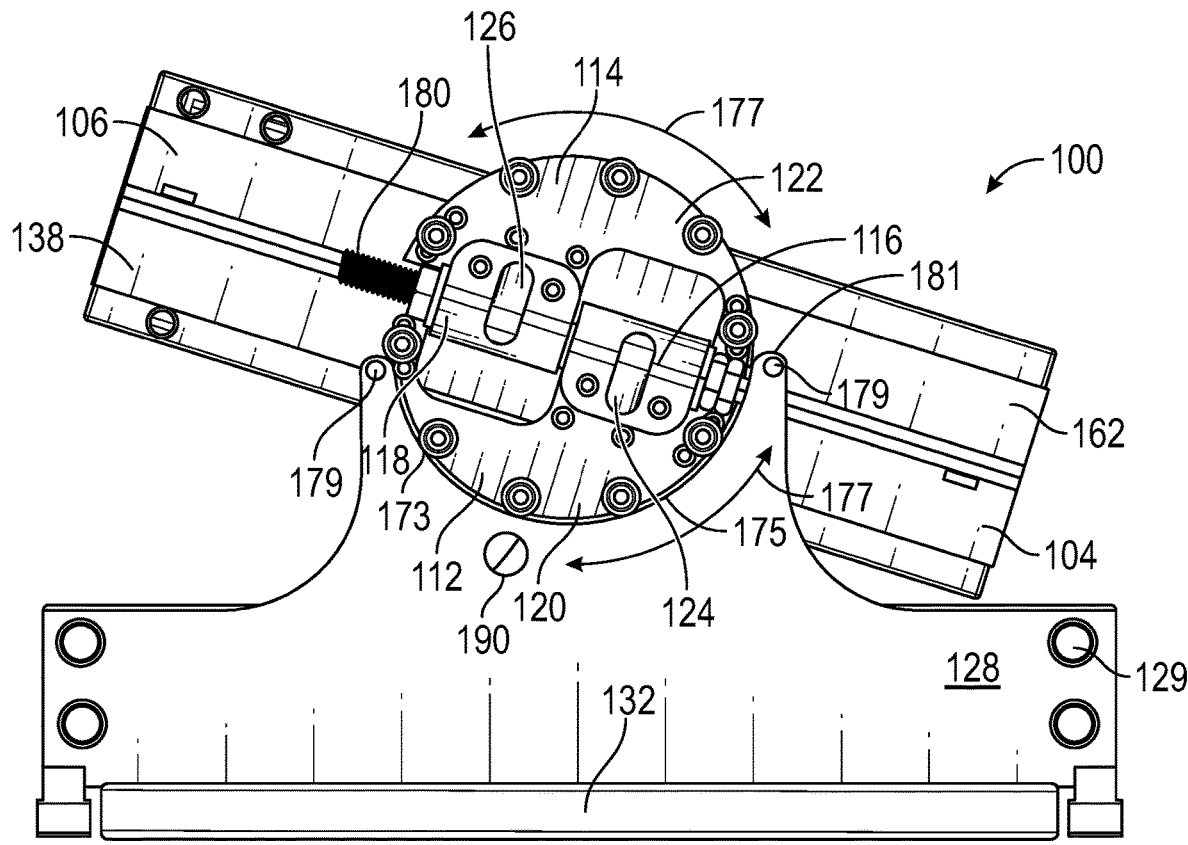
FIG. 4B shows a first cooking assembly, a second cooking assembly, and the hinge of the cooking apparatus rotating about a rotational axis.

Referring to FIGS. 3 and 4A-4B, in addition to housing the cooking surfaces 134 and insert plates 136, the recessed plates 138, 162 of the first and second assemblies 104, 106 are each coupled to a respective portion of the hinge 102. In particular, the recessed plate 138 of the first assembly 104 is coupled to the first portion 112, while the recessed plate 162 of second assembly 106 is coupled to the second portion 114 of the hinge 102. In representative examples, the hinge portions 112, 114 and their respective recessed plates 138, 162 are assembled from the individual components. For instance, each leaf 120, 122 can also include one or more openings 186 sized and shaped to receive one or more corresponding screws or bolts to couple the first and second portions 112, 114 of the hinge 102 to a recessed plates 138, 162. In other examples, the recessed plates 138, 162 of the first and second assemblies 104, 106 can be combined with their respective hinge portions 112, 114 to form a unitary component.

As shown in FIG. 3, the recessed plate 138 is also coupled to a handle member 156, which is configured to receive and couple to a respective handle 110. By extension, the second assembly 106 is also coupled to a respective handle member 156. Each recessed plate 138, 162 can also include a plurality of bores 160 that can be used to couple the recessed plates 138, 162, for instance, to other components of the cooking apparatus 100. In the case of the first assembly 104, for example, the bores 160 can be used to couple a leg or support member 196 which is configured to support the weight of the first assembly 104 while operating in griddle mode (FIG. 6). Each component coupled to the recessed plates 138, 162 can be coupled via screws, bolts, and/or other suitable components.

As shown in FIGS. 3 and 4A-4B, each leaf 120, 122 of the first and second portions 112, 114 of the hinge 102 includes a rounded outer edge portion 164, 166 and an inner edge portion 168, 170. The inner edge portions 168, 170 can span the distance between diametrically opposed ends of the outer edge portions 164, 166. Each leaf 120, 122 in this configuration forms one half of the overall circular shape of the hinge 102. Each leaf 120, 122, however, can be formed in a variety of different shapes.

The outer edge portions 164, 166 of each leaf 120, 122 can include one or more projections 172 that extend outwardly from the surface of the leaf and are arranged circumferentially around the knuckles 116, 118 and along the outer edge portions 164, 166. The projections 172 can be configured to mate with a plurality of corresponding bearings 173. These projections 172 and bearings 173 can, for instance, allow the first and second assemblies 104, 106 to rotate relative to the base 108 and brackets 128, 130, and 180 degrees about the second rotational axis A2 (e.g., FIG. 1). Specifically, as shown in FIGS. 4A-4B, a rounded edge 175 within the plane and upper portion of the bracket 128 can be sized and shaped to receive the plurality of bearings 173. The bearings 173 in this way, can contact the rounded edge 175 when the hinge 102 is received within the bracket 128 and can rotate relative to the projections 172 and the base 108. This rotation of the bearings 173 can allow the hinge 102 and thereby, the first and second assemblies 104, 106, to rotate clockwise and counterclockwise relative to the base 108, as shown in FIG. 4B and indicated by arrows 177.

In a similar manner, each handle member 156 (FIGS. 3 and 5-6) can be received within a similarly sized and shaped rounded edge (not shown) in the upper portion of bracket 130 (e.g., FIG. 6). The rounded edges of the handle members 156 can be configured (e.g., via outer grooves) to rotate clockwise and counterclockwise within the rounded edge of the bracket 130 as the first and second assemblies 104, 106 rotate. As such, an operator can rotate the first and second assemblies 104, 106, 180 degrees clockwise and counterclockwise via the handles 110, such as when operating in waffle mode and rotating the cooking assemblies is desired.

In some examples, the hinge 102 and/or the handle members 156 are coupled to the brackets 128, 130 of the base 108 by way of the weight of the first and second cooking assemblies 104, 106. For instance, the combined weight of the first and second assemblies 104, 106 can be such that upward and/or axial movement (e.g., along the second rotational axis A2) of the assemblies is limited, but that the hinge 102 and handle members 156 are still securely coupled to and able to rotate relative to the base 108. In other examples, the hinge and handle members can be coupled to the base in a variety of ways, such as grooves or a track within the brackets configured to receive the hinge and handle members.

As best illustrated in FIGS. 4A-4B, the upper portion of bracket 128 can also include a pair of openings 179 configured to receive a pair of corresponding pins (not shown), which act to limit the rotation of the first and second assemblies 104, 106. In particular, two upwardly extending apices 181 on both sides of the rounded edge 175 of the bracket 128 can each include an opening 179 to receive a pin. The pins, which can extend outwardly from the planar surface of the bracket 128 (e.g., pointing out of the page of FIGS. 4A-4B), can limit the rotation of the first and second assemblies 104, 106 by contacting one or more components of the hinge 102 and/or cooking assemblies 104, 106 during rotation. For instance, each pin received within an opening 179 can extend outwardly and be configured to contact an exposed portion of a pin 180 coupling the hinge portions 112, 114, thereby limiting rotation of the first and second assemblies 104, 106 in either direction to 180 degrees.

To illustrate, FIG. 4B shows the first and second assemblies 104, 106 rotated in a counterclockwise direction from their initial orientation shown in FIG. 4A, that is, where the first assembly 104 is the upper assembly and the second assembly 106 is the lower assembly. As the first and second assemblies 104, 106 are rotated counterclockwise, the exposed portion of the pin 180 (e.g., the external threads of the pin 180) eventually contacts the pin extending from the opening 179 on the left side of the rounded edge 175. This contact between the pin 180 of the hinge 102 and the pin of the base prevents the first and second assemblies 104, 106 from rotating beyond the 180 degrees of rotation from the initial orientation shown in FIG. 4A. In this second orientation (i.e., 180 degrees rotated), the second assembly 106 is the upper assembly and the first assembly 104 is the lower assembly. In the same manner, as the first and second assemblies 104, 106 are rotated clockwise back to their initial orientation (FIG. 4A), the pin extending from the opening 179 on the right side of the rounded edge 175 can make contact with the pin 180 such that first and second assemblies 104, 106 are again prevented from rotating more than 180 degrees.

Referring to FIGS. 1-2 and 4A-4B, in some examples, the base 108 of the cooking apparatus 100 can also include one or more tubes 127 and corresponding openings 129 to direct wiring and/or other components from the housing 140 and control system (FIG. 9) to the first and second assemblies 104, 106. As an example, electrical wiring in communication with a control system within the housing 140 can extend through the tubes 127 extending between the two brackets 128, 130 of the base and out through openings 129 located within the planar surface of bracket 128. The wiring can, in this case, be feed to one or more inlets 147 of the outer panels 146 of the first and second assemblies 104, 106 housing respective electrical components. In this configuration, it can be further beneficial to limit the rotation of the first and second assemblies 104, 106 to 180 degrees to prevent the wiring and casing thereof from becoming tangled and/or twisted to a degree in which the wiring is damaged and/or movement of the first and second assemblies 104, 106 is inhibited.

As shown in FIGS. 3 and 4A-4B, each inner edge portion 168, 170 includes a respective knuckle 116, 118 and a cutout 174, 176. Each knuckle 116, 118 includes a central bore 178 extending along its length and sized and shaped to receive the pin 180 therethrough. As illustrated in FIGS. 4A-4B, the knuckles 116, 118 are coaxially aligned and configured to rotate relative to one another about a longitudinal axis of the pin 180. In this manner, the longitudinal axis of the pin 180 is also a rotational axis of the of the knuckles 116, 118 and is the first rotational axis A1 by which the first and second portions 112, 114 of the hinge 102 and the first and second assemblies 104, 106 pivot. In some examples, the pin 180 can have external threads along a portion of its length that are exposed beyond the central bore 184 to mate with corresponding internal threads of one or more nuts 182 such that the first and second portions 112, 114 of the hinge 102 are coupled to one another.

As shown in FIG. 3, each knuckle 116, 118 of the first and second portions 112, 114 of the hinge 102 include a bore 184 configured to receive a respective stopper member 124, 126. Each bore 184 can have internal threads configured to mate with external threads of the stopper members 124, 126 such that the stopper members 124, 126 and knuckles 116, 118 are configured to couple and decouple from one another. For instance, rotation of a stopper member 124, 126 in a first direction (e.g., clockwise) relative to the bore 184 can secure the stopper member 124, 126 within a respective knuckle, while rotation of the stopper member 124, 126 in a second direction (e.g., counterclockwise) can cause the stopper member 124, 126 to be removed. Each knuckle 116, 118 can also include one or more openings 188 sized and shaped to receive one or more corresponding screws or bolts to couple the first and second portions 112, 114 of the hinge 102 to their respective recessed plates 138, 162 and/or other components of the apparatus 100.

As shown in FIG. 3, the bore 184 is offset and to the side of the central bore 178 within the body of the knuckle 116, 118. That is, the longitudinal axes of the bore 184 and central bore 178 do not intersect. In this way, the side profile of each knuckle 116, 118 (e.g., looking down the longitudinal axis of the central bore 178) is relatively narrow in comparison to a side profile of each knuckle if the knuckles had the longitudinal axes of the central bore 178 and bore 184 intersecting. In other words, each knuckle 116, 118 has a relatively narrow profile or depth D1 because the central bore 178 and the bore 184 do not intersect or lie within the same plane. This arrangement allows the central bore 178 and bore 184 to be situated side-by-side within the body of the knuckles 116, 118, without having to increase the knuckle depth D1. The knuckle depth D1 in this instance, can be defined as the length between the inner most surface of a knuckle (e.g., surface of the leaf or knuckle in contact with a recessed plate) and the outer most surface of the knuckle (e.g., where the opening to the bore 184 is located). This narrow profile of the knuckles 116, 118, for instance, allows the hinge 102 to have minimal swing angle and overall hinge depth.

FIGS. 3 and 4A-4B shows the longitudinal axis of the bore 184 is also perpendicular to the surface of each leaf 120, 122. As such, each stopper member 124, 126 received by a bore 184 is also perpendicular to its respective leaf 120, 122 and extends outwardly from the surface of the knuckles 116, 118. The stopper members 124, 126 in this configuration, can be used to limit rotation between the first and second portions 112, 114 of the hinge 102 and thereby, the first and second assemblies 104, 106. While coupled to the knuckles 116, 118, for instance, the stopper members 124, 126 rotate with their respective knuckles 116, 118 and relative to one another as the first and second assemblies 104, 106 move between opened and closed states. As the first and second assemblies 104, 106 are opened, the stopper members 124, 126 extending outwardly from the surface of the knuckles 116, 118 eventually contact a respective surface of one or more components of the apparatus 100 thereby limiting further rotation of the knuckles 116, 118 and movement between the assemblies 104, 106. It is this contact and limit in rotation that is useful when operating the apparatus 100 in waffle mode.

FIGS. 4A-4B and 5 show the apparatus 100 in a closed and opened state, respectively, while operating in waffle mode. While in waffle mode, the stopper members 124, 126 are coupled to their respective knuckles 116, 118 and the first and second assemblies 104, 106, each of which can include a cooking surface 134, such as the waffle plate 135 (e.g., traditional, cone, bubble, etc.). As depicted in FIG. 5, as the first assembly 104 is raised relative to the second assembly 106 to open the apparatus 100, the stopper member 124 coupled to the knuckle 116 and first assembly 104 contacts the base 108. This contact between the stopper member 124 of the first assembly 104 and the base 108 is enough to resist further rotation between the knuckles 116, 118 and movement between the assemblies 104, 106, thereby preventing the first assembly 104 from opening any further. Because the first assembly 104 is prevented from moving beyond the point at which the stopper member 124 contacts the base 108, the first assembly 104 can be held in place in an opened state until the first assembly 104 is directed back toward the second assembly 106. In this way, while in waffle mode, the first assembly 104 can be raised and positioned in a convenient upright orientation to allow the operator to retrieve food or poor batter onto the cooking surfaces 134 and be able to quickly return the apparatus 100 back into a closed state. In some examples, the first assembly 104 while in the upright orientation, can form an angle ranging from 95 degrees to 105 degrees relative to the second assembly 106.

In the same manner, the stopper member 126 coupled to knuckle 118 can limit relative movement between the first and second assemblies 104, 106 when the second assembly 106 is in the upper position and raised into an opened state. Specifically, when the first and second assemblies 104, 106 are rotated 180 degrees about the second rotational axis A2 such that the second assembly 106 is the upper assembly, the stopper member 126 functions in the same way as the stopper member 124 as discussed above to limit relative movement of the second assembly 106.

In representative examples, the ends 190 of the stopper members 124, 126 furthest from their respective knuckles 116, 118 can have a curved, L-like shape, which helps to contact the base 108 and maintain the apparatus 100 in an opened state. In such examples and as shown in FIGS. 4A-4B and 5, for instance, the base 108 can include an aperture 192 extending through the bracket 128 and sized and shaped to receive the curved ends 190 of a corresponding stopper member to secure the positioning of the first and second assemblies 104, 106. As depicted in FIG. 5, for example, the curved end 190 of the stopper member 124 is received by the aperture 192 such that the position of the first assembly 104 is held firmly and limits any potential lateral movement of the first assembly 104 while in an opened state.

Upon removal of the stopper members 124, 126, relative movement of the hinge 102 and between the first and second assemblies 104, 106 about the rotational axis A1 is no longer limited by contact made between the stopper members 124, 126 and base 108. In this instance, the configuration of the hinge 102 allows the first and second assemblies 104, 106 to be moved into a fully opened state in which the apparatus 100 operates in griddle mode (FIG. 6), such that the first and second assemblies 104, 106 are coplanar and in a flat orientation. In this manner, the first leaf 120 and second leaf 122 can be said to lie within the same plane while in a closed state (e.g., FIGS. 4A-4B) and parallel while in a fully opened state (e.g., FIG. 6).

As mentioned above and as illustrated in FIGS. 3, 4A-4B, and 6, each inner edge portions 168, 170 of the first and second portions 112, 114 of the hinge 102 includes a cutout 174, 176. Each cutout 174, 176 can be sized and shaped to receive the outer dimensions of a respective, opposing knuckle 116, 118 as the hinge 102 and the apparatus 100 are moved into a fully opened state to operate in griddle mode (FIG. 6). Specifically, as the first leaf 120 of the first portion 112 and the second leaf 122 of the second portion 114 become parallel to one another, such as when the first and second assemblies 104, 106 are coplanar, the cutout 174 of the first portion 112 receives the second knuckle 118 of the second portion 114, while the cutout 176 of the second portion 114 receives the first knuckle 116 of the first portion 112. In each case, the knuckles 116, 118 extend through the volume of their respective cutouts 174, 176 when the hinge 102 is in a fully opened state. As such, the volume of each cutout can be said to be free of a respective knuckle while in an opened stated and receives a respective knuckle in a closed state.

Moreover, the cutouts 174, 176 of the first and second portions 112, 114 of the hinge 102 and the narrow profile of the knuckles 116, 118 allow the apparatus 100 to have relatively narrow spacing between the first and second assemblies 104, 106 while in griddle mode. As shown in FIG. 6, since the knuckles 116, 118 extend through the volume of the cutouts 174, 176, the spacing D2 between the first and second assemblies 104, 106 can be equal to or approximately equal to the depth D1 of the knuckles 116, 118. For instance, the spacing D2 between the first and second assemblies 104, 106 while in a fully opened state can be within 25%, 20%, 15%, 10%, or 5% of the depth D1 of the knuckles 116, 118. As a result, the spacing D1 between the cooking surfaces 134 of the first and second assemblies 104, 106 is minimized. Accordingly, the hinge 102 can provide the functionality of the stopper members 124, 126, while maintaining minimal spacing between the first and second assemblies 104, 106 and minimal swing angle.

As indicated above, while operating in griddle mode, the first and second assemblies 104, 106 can form an angle of 180 degrees relative to one another such that the first and second assemblies 104, 106 are coplanar and form a flat cooking surface. As such, the cooking surfaces 134 of the assemblies can be changed to the griddle plate 194 for cooking. When operating in griddle mode, a support member 196 (e.g., leg) can also be coupled to the first assembly 104 (e.g., via bores 160) to support the weight and secure the position of the first assembly 104 during operation. In some examples, one or more support members 196 are coupled to the first assembly 104. In examples where the second assembly 106 is the upper assembly, the support member 196 can be coupled to the second assembly to support the weight and secure the position of the second assembly.

FIG. 9 is a schematic block diagram of a control system 200 operable to control the cooking apparatus 100. The illustrated control system 200 can be a computing device 202 situated within the housing 140 and in communication with first and second cooking assemblies 104, 106. The computing device 202 can include a processor or controller and a memory. The computing device can include a programmable logic controller (PLCs), a proportional-integral-derivative controller (PID), a microcontroller, a system-on-a-chip, or the like. The controller can include one or more CPUs, GPUs, ASICs, FPGAs, MCUs, PLDs, CPLDs, etc., that can perform various data processing, signal coding, power control, and/or I/O functions associated with the cooking apparatus 100. The memory of the computing device 202 can be volatile and/or non-volatile memory (e.g., RAM, ROM, flash, hard drive, etc.) and/or be removeable or non-removable. The memory can provide storage for various process-executable logic instructions and program modules which when executed by the processing unit can, for example, control the heat supplied to the first and second cooking assemblies 104, 106.

The control system 200 can also include additional features. For instance, the control system 200 can include one or more input devices 204, one or more output devices 206, one or more alarms or sensors 208-214, and one or more system buses to provide a communication path between the controller and the various components of the control system 200.

The input devices 204 can include switches and/or other interactive controls configured to allow the operator, for example, to control cooking temperatures and determine which cooking assembly is operational. For instance, the input devices 204 can include a toggle switch (e.g., DPDT) which can be configured to direct the control system 200 (e.g., using a solid state relay) to heat one, both, and/or neither one of the cooking assemblies. Specifically, the control system 200 can supply heat to one of the first and second cooking assemblies 104, 106, (e.g., in griddle mode) when the switch is in a first position, can supply heat to both first and second assemblies 104, 106 when the switch is in a second position, and can cutoff heat to both the assemblies when the switch is in a third position. The control system 200 can also include other switches, contractors, or relays, such as solid state relays, to provide power to the heating elements and/or components. A solid state relay can, for example, provide modulated power to keep operating temperatures of the cooking apparatus 100 consistent.

System parameters or performance outputs, such as temperatures, can be displayed via one or more of the output devices, including a display (e.g., a LCD) and can be controlled by one or more of the input/output devices 204, 206. The control system 200 can also include an alarm 208 for indicating when a set or cooking temperature or time is reached, a proximity sensor 210 to determine when the first and second cooking assemblies 104, 106 are in an opened or closed stated, and a temperature sensor 212 for measuring the actual temperature of the assemblies. The control system 200 can also include one or more rotary sensors 214 to detect when the first and second cooking assemblies 104, 106 have been rotated (e.g., 180 degrees). In some examples, the alarm 208 can be configured to indicate to the operator that the cooking assemblies 104, 106 should be rotated, such as after a predetermined time or temperature is reached. In such examples, as the first and second cooking assemblies 104, 106 are rotated, the rotary sensor 214 can signal to the alarm 208 (and/or computing device 202) that the cooking assemblies have been rotated.

GENERAL CONSIDERATIONS

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present, or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses the terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

As used in the application and in the claims, the singular forms "a," "an," and "the" include the plural forms unless the context clearly dictates otherwise. Additionally, the term "includes" means "comprises." Further, the terms "coupled" and "connected" generally mean electrically, electromagnetically, and/or physically (e.g., mechanically or chemically) coupled or linked and does not exclude the presence of intermediate elements between the coupled or associated items absent specific contrary language.

Directions and other relative references (e.g., inner, outer, upper, lower, etc.) may be used to facilitate discussion of the drawings and principles herein, but are not intended to be limiting. For example, certain terms may be used such as "inside," "outside," "top," "down," "interior," "exterior," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same. As used herein, "and/or" means "and" or "or," as well as "and" and "or."

Additional Examples of the Disclosed Technology

In view of the above described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1: A cooking apparatus comprising: a base; and a first cooking assembly, a second cooking assembly pivotably coupled to the first cooking assembly, and a pair of removable cooking surfaces, the first cooking assembly and the second cooking assembly each being rotatably coupled to the base and configured to receive a respective removable cooking surface, wherein the first cooking assembly and the second cooking assembly are moveable between an opened state and a closed state, the opened state being a configuration in which the cooking surface of the first cooking assembly and the cooking surface of the second cooking assembly are spaced apart and facing the same direction, and the closed state being a configuration in which the cooking surface of the first cooking assembly and the cooking surface of the second cooking assembly are facing each other in an opposing relationship, wherein the first cooking assembly and the second cooking assembly are configured to rotate about a first rotational axis while in the closed state and pivot relative to one another about a second rotational axis while in the opened state.

Example 2: The cooking apparatus of any example herein, particularly example 1, wherein the first cooking assembly and the second cooking assembly are configured to rotate 180 degrees about the first rotational axis while in a closed state.

Example 3: The cooking apparatus of any example herein, particularly any one of examples 1-2, wherein the first cooking assembly and the second cooking assembly are configured to pivot 180 degrees relative to one another about the second rotational axis while in the opened state.

Example 4: The cooking apparatus of any example herein, particularly any one of examples 1-3, wherein the second rotational axis is perpendicular to the first rotational axis.

Example 5: The cooking apparatus of any example herein, particularly any one of examples 1-4, wherein at least one of the pair of removable cooking surfaces is a waffle plate.

Example 6: The cooking apparatus of any example herein, particularly any one of examples 1-5, wherein at least one of the pair of removable cooking surfaces is a griddle plate.

Example 7: The cooking apparatus of any example herein, particularly any one of examples 1-6, wherein in the closed state, the first cooking assembly and the second cooking assembly are positioned parallel to one another.

Example 8: The cooking apparatus of any example herein, particularly any one of examples 1-7, wherein in a fully opened state, the first cooking assembly and the second cooking assembly are positioned coplanar with one another.

Example 9: The cooking apparatus of any example herein, particularly any one of examples 1-8, wherein the first cooking assembly and the second cooking assembly each comprise a recessed plate configured to receive a respective removable cooking surface.

Example 10: The cooking apparatus of any example herein, particularly example 9, further comprising a pair of insert plates, each plate situated between an inner surface of the recessed plate and an outer surface of the removable cooking surface of a respective cooking assembly.

Example 11: The cooking apparatus of any example herein, particularly any one of examples 1-10, further comprising a switch configured to supply heat to one of the first and the second cooking assemblies in a first position and to supply heat to both the first and second cooking assemblies in a second position.

Example 12: The cooking apparatus of any example herein, particularly any one of examples 1-11, further comprising a hinge configured to position the first cooking assembly and the second cooking assembly in the closed state, the opened state, and a fully opened state, wherein in the opened state the first cooking assembly and the second cooking assembly form an angle between 0 degrees and 180 degrees relative to one another.

Example 13: A cooking apparatus comprising: a base; a first cooking assembly and a second cooking assembly, each cooking assembly comprising a cooking surface; and a hinge comprising a first portion and a second portion, the first portion of the hinge comprising a first knuckle and a first leaf coupled to the first cooking assembly and the second portion of the hinge comprising a second knuckle and a second leaf coupled to the second cooking assembly, wherein the first knuckle and the second knuckle are coaxially aligned and configured to rotate relative to one another such that the first cooking assembly and the second cooking assembly pivot relative to one another about a first rotational axis; wherein the hinge is rotatably coupled to the base such that the first cooking assembly and the second cooking assembly are configured to rotate about a second rotational axis.

Example 14: The cooking apparatus of any example herein, particularly example 13, the hinge further comprising a plurality of rotational members arranged circumferentially around the first and second knuckles and coupled to the base, wherein each rotation member is configured to rotate relative to the base such that the first and second cooking assemblies rotate about the second rotational axis.

Example 15: The cooking apparatus of any example herein, particularly example 14, the base further comprising a rounded edge configured to receive the rotational members of the hinge and guide the hinge as the first and second cooking assemblies rotate about the second rotational axis.

Example 16: The cooking apparatus of any example herein, particularly any one of examples 13-15, the hinge further comprising a stopper member configured to limit relative movement between the first and second cooking assemblies about the first rotational axis.

Example 17: The cooking apparatus of any example herein, particularly example 16, wherein the stopper member is configured to contact the base as the first and second cooking assemblies pivot relative to one another about the first rotational axis.

Example 18: The cooking apparatus of any example herein, particularly any one of examples 13-17, the hinge further comprising a first stopper member coupled to the first knuckle and a second stopper member coupled to the second knuckle, wherein the first stopper member limits relative movement between the first and second cooking assemblies about the first rotational axis when the first and second cooking assemblies are in a first orientation and the second stopper member limits relative movement between the first and second cooking assemblies about the first rotational axis when the first and second cooking assemblies are in a second orientation.

Example 19: The cooking apparatus of any example herein, particularly any one of examples 13-18, wherein the base is configured to limit rotation of the first and second cooking assemblies about the second rotational axis.

Example 20: A waffle maker comprising: a base; a first cooking assembly, a second cooking assembly coupled to the first cooking assembly, a pair of removable waffle cooking surfaces, and a pair of removable griddle cooking surfaces, the first cooking assembly and the second cooking assembly each configured to receive a respective removable cooking surface; a hinge comprising a first portion and a second portion, the first portion of the hinge comprising a first knuckle and a first leaf coupled to the first assembly and the second portion of the hinge comprising a second knuckle and a second leaf coupled to the second assembly, wherein the first knuckle and the second knuckle are coaxially aligned and configured to rotate relative to one another such that the first assembly and the second assembly pivot relative to one another about a first rotational axis; and a pair of stopper members, each stopper member configured to couple and decouple from the first and second knuckles and limit relative movement between the first and second cooking assemblies, wherein the hinge is rotatably coupled to the base such that the first cooking assembly and the second cooking assembly are configured to rotate about a second rotational axis.

Example 21: A hinge comprising: a first knuckle and a second knuckle coaxially aligned with the first knuckle, each knuckle comprising a central bore configured to receive a pin therethrough such that the first knuckle and the second knuckle are configured to rotate relative to one another about a longitudinal axis of the pin; and a first leaf coupled to the first knuckle and a second leaf coupled to the second knuckle; wherein at least one of the first knuckle and the second knuckle is configured to couple and decouple to a stopper member, the stopper member being configured to limit the relative rotation between the first knuckle and the second knuckle.

Example 22: The hinge of any example herein, particularly example 21, wherein each leaf comprises an inner edge portion, the inner edge portion of the first leaf being configured to receive the second knuckle and the inner edge portion of the second leaf being configured to receive the first knuckle as the first knuckle and the second knuckle rotate relative to one another about the longitudinal axis of the pin.

Example 23: The hinge of any example herein, particularly any one of examples 21-22, wherein a longitudinal axis of the stopper member is perpendicular to its respective leaf.

Example 24: The hinge of any example herein, particularly any one of examples 21-23, wherein a longitudinal axis of the stopper member is offset from the longitudinal axis of the pin.

Example 25: The hinge of any example herein, particularly any one of examples 21-24, wherein the stopper member is configured to contact a component coupled to one of the first leaf and the second leaf such that relative rotation of the first knuckle and the second knuckle is limited.

Example 26: The hinge of any example herein, particularly any one of examples 21-25, wherein at least one of the first knuckle and the second knuckle comprises an outer bore configured to receive and mate with the stopper member, Example 27: The hinge of any example herein, particularly example 26, wherein a longitudinal axis of the outer bore is offset from the longitudinal axis of the pin extending through the central bore.

Example 28: The hinge of any example herein, particularly any one of examples 21-27, wherein each leaf comprises a rounded outer edge portion.

Example 29: The hinge of any example herein, particularly any one of examples 21-28, wherein the first knuckle and the second knuckle are configured to receive a stopper member, each stopper member being configured to contact a component coupled to one of the first leaf and the second leaf such that relative rotation of the first knuckle and the second knuckle is limited.

Example 30: The hinge of any example herein, particularly any one of examples 21-29, wherein the first leaf and the second leaf are configured to lie within the same plane in a first orientation and are parallel to one another in a second orientation.

Example 31: The hinge of any example herein, particularly example 30, wherein each inner edge portion comprises a cutout configured to receive a respective knuckle, wherein a volume of each cutout is free of the respective knuckle in the first orientation and receives the respective knuckles in the second orientation.

Example 32: The hinge of any example herein, particularly any one of examples 21-31, the hinge further comprising a plurality of rotational members arranged circumferentially around the first and second knuckles and configured to rotate relative to the first leaf and the second leaf, wherein the rotational members allow the hinge to rotate relative to a base in which the hinge is coupled.

In view of the many possible embodiments to which the principles of the disclosed technology may be applied, it should be recognized that the illustrated embodiments are only preferred examples and should not be taken as limiting the scope of the disclosure. I therefore claim all that comes within the scope and spirit of the appended claims.

I claim:

1. A cooking apparatus comprising:
   a base;
   a first cooking assembly and a second cooking assembly, each cooking assembly comprising a cooking surface; and
   a hinge comprising:
      a first leaf coupled to the first cooking assembly;
      a second leaf coupled to the second cooking assembly;
      a first hinge mechanism comprising a first knuckle coupled to the first leaf and a second knuckle coupled to the second leaf, wherein the first knuckle is capable of rotating about a first rotational axis relative to the second knuckle; and
      a second hinge mechanism comprising:
         a first plurality of protrusions arranged along an outer edge portion of the first leaf;
         a second plurality of protrusions arranged along an outer edge portion of the second leaf; and
         a rounded edge portion of the base that engages at least one of the first plurality of protrusions and the second plurality of protrusions,
         wherein the second hinge mechanism is centered about and is capable of rotating about a second rotational axis, the second rotational axis being perpendicular to the first rotational axis and extending between the first leaf and the second leaf; and
         wherein the first knuckle and the second knuckle are coaxially aligned and configured to rotate relative to one another about the first rotational axis such that the first cooking assembly and the second cooking assembly pivot relative to one another about the first rotational axis from a closed configuration to an open configuration;
      wherein the hinge is rotatably coupled to the base such that the first cooking assembly and the second cooking assembly are configured to rotate about the second rotational axis.

2. The cooking apparatus of claim 1, the hinge further comprising a plurality of rotational members arranged circumferentially around the first and second knuckles and coupled to the base, wherein each rotation member is configured to rotate relative to the base such that the first and second cooking assemblies rotate about the second rotational axis.

3. The cooking apparatus of claim 2, wherein the rounded edge portion of the base is configured to receive the rotational members of the hinge and guide the hinge as the first and second cooking assemblies rotate about the second rotational axis.

4. The cooking apparatus of claim 1, the hinge further comprising a stopper member configured to limit relative movement between the first and second cooking assemblies about the first rotational axis.

5. The cooking apparatus of claim 4, wherein the stopper member is configured to contact the base as the first and second cooking assemblies pivot relative to one another about the first rotational axis.

6. The cooking apparatus of claim 1, the hinge further comprising a first stopper member coupled to the first knuckle and a second stopper member coupled to the second knuckle, wherein the first stopper member limits relative movement between the first and second cooking assemblies about the first rotational axis when the first and second cooking assemblies are in a first orientation and the second stopper member limits relative movement between the first and second cooking assemblies about the first rotational axis when the first and second cooking assemblies are in a second orientation.

7. The cooking apparatus of claim 1, wherein the base is configured to limit rotation of the first and second cooking assemblies about the second rotational axis.

\* \* \* \* \*